US009578758B2

(12) United States Patent
Mo et al.

(10) Patent No.: US 9,578,758 B2
(45) Date of Patent: Feb. 21, 2017

(54) MOBILE TERMINAL

(71) Applicant: LG Electronics Inc., Seoul (KR)

(72) Inventors: Chanyong Mo, Seoul (KR); Kiju Yun, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 172 days.

(21) Appl. No.: 13/841,922

(22) Filed: Mar. 15, 2013

(65) Prior Publication Data

US 2014/0085836 A1   Mar. 27, 2014

(30) Foreign Application Priority Data

Sep. 25, 2012 (KR) .................. 10-2012-0106444
Sep. 25, 2012 (KR) .................. 10-2012-0106445

(51) Int. Cl.
   *H05K 5/00*     (2006.01)
   *G06F 1/18*     (2006.01)
   *G06F 1/16*     (2006.01)
   *H04M 1/02*     (2006.01)

(52) U.S. Cl.
   CPC .......... *H05K 5/0017* (2013.01); *G06F 1/1626* (2013.01); *G06F 1/1656* (2013.01); *G06F 1/184* (2013.01); *H04M 1/0266* (2013.01); *H04M 1/0277* (2013.01)

(58) Field of Classification Search
   CPC ...... G06F 1/1626; G06F 1/1656; G06F 1/184; H04M 1/0266; H04M 1/0277; H05K 5/0017

USPC ........................ 361/728–732, 748, 749, 752, 760,361/776–778, 800, 807, 809, 814; 455/575.1–575.4, 575.7
See application file for complete search history.

(56) References Cited

U.S. PATENT DOCUMENTS

| 2008/0019502 A1* | 1/2008 | Emmert ................ H04M 1/026 379/433.07 |
| 2009/0015565 A1* | 1/2009 | Hong .................... G06F 1/1624 345/173 |
| 2010/0137043 A1* | 6/2010 | Horimoto et al. ......... 455/575.7 |
| 2010/0140073 A1* | 6/2010 | Lee ............................... 200/520 |
| 2011/0053653 A1* | 3/2011 | Tho ...................... H04M 1/0202 455/566 |
| 2012/0177237 A1* | 7/2012 | Shukla ................ B29C 45/1671 381/332 |
| 2014/0177151 A1* | 6/2014 | Manda et al. ............. 361/679.3 |

* cited by examiner

*Primary Examiner* — Timothy Thompson
*Assistant Examiner* — Ahmad D Barnes
(74) *Attorney, Agent, or Firm* — Birch, Stewart, Kolasch & Birch, LLP

(57) ABSTRACT

A mobile terminal is provided. The mobile terminal a case having an inner space where electronic components are mounted, a display arranged in the inner space of the case, the display being exposed at a front surface of the case, an audio output module arranged in the inner space of the case to output sound, a circuit board arranged in the inner space of the case, the circuit board having a circuit pattern to transmit an electric signal, a bracket coupled to a back surface of the display, the bracket including a metallic plate and an injection mold configured to partially cover the metallic plate and an electric current carrying structure configured to electrically connect the metal plate to at least one of the display, the audio output module and the circuit board.

6 Claims, 12 Drawing Sheets

MOBILE TERMINAL

This application claims the benefit of earlier filing date and right of priority to Korean Application No.10-2012-0106444 and Korean Application No. 10-2012-0106445, both filed on Sep. 25, 2012, the contents of which are hereby incorporated by reference herein in their entireties.

BACKGROUND OF THE DISCLOSURE

Field of the Disclosure

The present invention relates to a mobile terminal, although the present invention is suitable for a wide scope of applications, more particularly, to a mobile terminal having an electric current carrying structure to reduce damage to electronic components generated by static electricity.

Discussion of the Related Art

Terminals can be classified into mobile terminals and stationary terminals. In addition, mobile terminals can be further classified into handheld terminals and vehicle mount terminals.

Further, a mobile terminal is a device which may be configured to perform various functions such as data and voice communications, capturing images and video via a camera, recording audio, playing music files and outputting music via a speaker system, and displaying images and video on a display Electronic components mounted in a mobile terminal are subject to static electricity, because they are activated by electric signals. In case the static electricity having a predetermined size or more is applied to electronic components, errors or breakage might occur to such electronic components.

SUMMARY OF THE DISCLOSURE

Accordingly, the present invention is directed to a mobile terminal. An object of the present invention is to provide a mobile terminal having an improved structure including an electric current carrying structure provided in a frame supporting a display to exhaust static electricity.

Additional advantages, objects, and features of the disclosure will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a mobile terminal includes a case comprising an inner space where electronic components are mounted; a display arranged in the inner space of the case to be exposed to a front surface of the case; an audio output module arranged in the inner space of the case to output sound; a circuit board arranged in the inner space of the case, with a circuit pattern formed therein to transmit an electric signal; a bracket coupled to a back surface of the display, the bracket comprising a metallic plate and an injection mold configured to partially cover the metallic plate; and an electric current carrying structure configured to electrically connect the metal plate to at least one of the display, the audio output module and the circuit board.

The electric current carrying structure may include an electric current carrying pattern formed adjacent to the display of the case, the electric current carrying pattern comprising a conductive material; a conductive gasket disposed between the electric current carrying pattern and the metallic plate.

The bracket may further include a guide hole fixed to a mold in injection molding, the guide hole having the metallic plate exposed there through, wherein the conductive gasket is electrically connected with the metallic plate exposed via the guide hole.

The bracket may include a first bracket having a back surface of the display coupled thereto; and a second bracket extended from the first bracket downward, and the conductive gasket may be positioned in the second bracket and the electric current carrying pattern may be extended from a circumference of the display downward.

A conductive material may be deposited on the case in a sputtering method, to form the electric current carrying pattern.

The electric current carrying structure may further include a metal mesh arranged in a front surface of the audio output module where sound is outputted, and the metal mesh may be arranged in contact with or adjacent to the metallic plate.

The metal mesh may have elasticity, and when the case and the audio output module are coupled to each other, the metal mesh may be transformable to contact with the case closely.

The electric current carrying structure may further include an electric current carrying pattern electrically connected to the metal mesh in an inner surface of the case; and a conductive gasket configured to electrically connect the electric current carrying pattern and the metallic plate with each other.

The bracket may further include a screw hole configured to expose the metallic plate via a side wall, and the electric current carrying structure may include a screw fastened to the screw hole via the circuit board.

The mobile terminal may further include a first bracket having a back surface of the display coupled thereto; and a recess extended from the first bracket downward to be inserted in the back surface, compared with the first bracket, to seat the interface unit therein.

The bracket may include a metallic plate; and an injection mold double-injection-molded in the metallic plate.

The metallic plate may be embedded and arranged in the injection mold formed in at least one surface of the recess.

The metallic plate may be exposed to at least one surface of the recess in contact with the interface unit.

A double-sided tape may be attached to a metallic plate exposed surface of the recess.

The mobile terminal may further include a terminal inserting hole formed in a lower end of the case, with a predetermined size corresponding to the size of an external input/output terminal, wherein the interface unit is arranged in the terminal inserting hole to expose a pin via the terminal inserting hole.

The mobile terminal may further include a circuit board coupled to a front surface of the second bracket to cover the recess, with a back surface electrically connected with the interface unit to transmit and receive an electric signal.

The mobile terminal may further include a metal dome coupled to a front surface of the circuit board, with a transformable shape according to presence of pressing to generate an electric signal; and a button unit positioned in a front surface of the button unit to be exposed outside the case, the button unit configured to transform the metal dome by pressing the metal dome.

The circuit board may be a flexible circuit board.

The interface unit may further include a coupling projection coupled to the circuit board, passing through the circuit board.

The mobile terminal may further include a third bracket extended from the first bracket upward to couple an audio output module thereto.

According to at least one of the embodiments described above, the electric current carrying structure is provided to exhaust the static electricity applied to the display of the mobile terminal via the metallic plate of the bracket. Accordingly, damage and errors generated by the static electricity of the display can be prevented.

Furthermore, the static electricity directly flowing to the audio output module can be bypassed by the bracket and the damage generated by the static electricity of the audio output module can be reduced.

Still further, the electric current carrying structure for electrically connecting the circuit board and the metallic plate of the bracket with each other may bypass the static electricity applied to the circuit board. Accordingly, damage and errors generated by the static electricity can be prevented.

Still further, the present invention may provide the stable connection structure not to break and short-cut the connection structure between the interface unit and the circuit board.

Still further, no auxiliary supporting structure for the interface has to be provided and the volume of the mobile terminal can be reduced.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. The above and other aspects, features, and advantages of the present invention will become more apparent upon consideration of the following description of preferred embodiments, taken in conjunction with the accompanying drawing figures. In the drawings.

DESCRIPTION OF SPECIFIC EMBODIMENTS

In the following detailed description, reference is made to the accompanying drawing figures which form a part hereof, and which show by way of illustration specific embodiments of the invention.

As used herein, the suffixes 'module', 'unit' and 'part' are used for elements in order to facilitate the disclosure only. Therefore, significant meanings or roles are not given to the suffixes themselves and it is understood that the 'module', 'unit' and 'part' can be used together or interchangeably.

The present invention can be applicable to a various types of mobile terminals. Examples of such terminals include mobile phones, user equipments, smart phones, digital broadcast receivers, personal digital assistants, laptop computers, portable multimedia players (PMP), navigators and the like.

Yet, it is apparent to those skilled in the art that a configuration according to an embodiment disclosed in this specification is applicable to such a fixed terminal as a digital TV, a desktop computer and the like as well as a mobile terminal.

Figure 1:
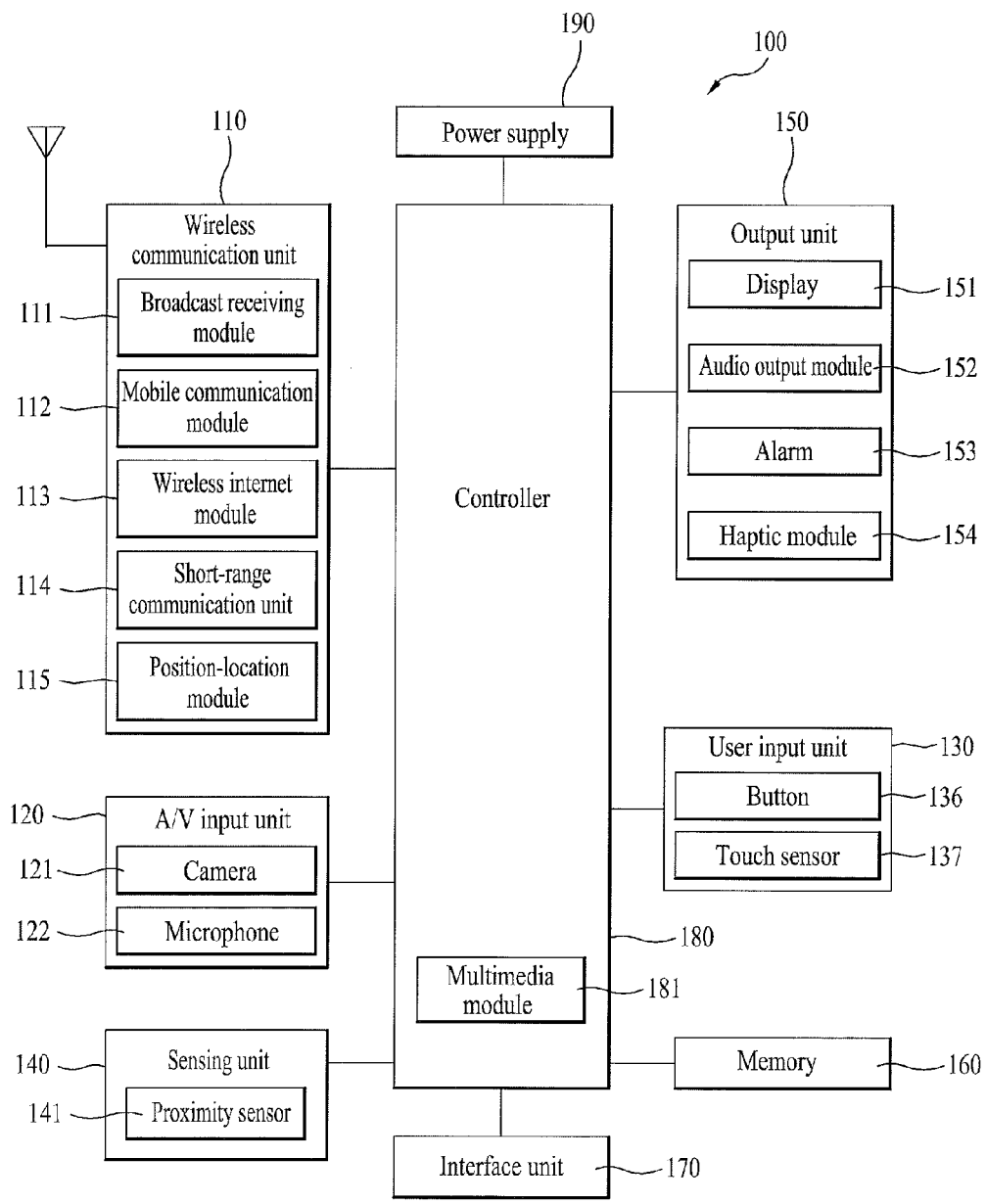
FIG. 1 is a block diagram of a mobile terminal according to one embodiment of the present invention.

FIG. 1 is a block diagram of a mobile terminal 100 in accordance with an embodiment of the present invention. FIG. 1 shows the mobile terminal 100 according to one embodiment of the present invention includes a wireless communication unit 110, an AN (audio/video) input unit 120, a user input unit 130, a sensing unit 140, an output unit 150, a memory 160, an interface unit 170, a controller 180, a power supply unit 190 and the like. FIG. 1 shows the mobile terminal 100 having various components, but it is understood that implementing all of the illustrated components is not a requirement. Greater or fewer components may alternatively be implemented.

In the following description, the above elements of the mobile terminal 100 are explained in sequence.

First of all, the wireless communication unit 110 typically includes one or more components which permits wireless communication between the mobile terminal 100 and a wireless communication system or network within which the mobile terminal 100 is located. For instance, the wireless communication unit 110 can include a broadcast receiving module 111, a mobile communication module 112, a wireless Internet module 113, a short-range communication module 114, a position-location module 115 and the like.

The broadcast receiving module 111 receives a broadcast signal and/or broadcast associated information from an external broadcast managing server via a broadcast channel. The broadcast channel may include a satellite channel and a terrestrial channel. At least two broadcast receiving modules 111 can be provided to the mobile terminal 100 in pursuit of simultaneous receptions of at least two broadcast channels or broadcast channel switching facilitation.

The broadcast managing server generally refers to a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and a data broadcast signal, among others. If desired, the broadcast signal may further include a broadcast signal combined with a TV or radio broadcast signal.

The broadcast associated information includes information associated with a broadcast channel, a broadcast program, a broadcast service provider, etc. And, the broadcast associated information can be provided via a mobile communication network. In this case, the broadcast associated information can be received by the mobile communication module 112.

The broadcast associated information can be implemented in various forms. For instance, broadcast associated information may include an electronic program guide (EPG) of digital multimedia broadcasting (DMB) and electronic service guide (ESG) of digital video broadcast-handheld (DVB-H).

The broadcast receiving module 111 may be configured to receive broadcast signals transmitted from various types of broadcast systems. By non-limiting example, such broadcasting systems include digital multimedia broadcasting-terrestrial (DMB-T), digital multimedia broadcasting-satellite (DMB-S), digital video broadcast-handheld (DVB-H), Convergence of Broadcasting and Mobile Service (DVB-CBMS), Open Mobile Alliance-BroadCAST (OMA-BCAST), China Multimedia Mobile Broadcasting (CMMB), Mobile Broadcasting Business Management System (MBBMS), the data broadcasting system known as media forward link only (MediaFLO®) and integrated services digital broadcast-terrestrial (ISDB-T). Optionally, the broadcast receiving module 111 can be configured suitable for other broadcasting systems as well as the above-explained digital broadcasting systems.

The broadcast signal and/or broadcast associated information received by the broadcast receiving module 111 may be stored in a suitable device, such as a memory 160.

The mobile communication module 112 transmits/receives wireless signals to/from one or more network entities (e.g., base station, external terminal, server, etc.) via a mobile network such as GSM (Global System for Mobile communications), CDMA (Code Division Multiple Access), WCDMA (Wideband CDMA) and so on. Such wireless signals may represent audio, video, and data according to text/multimedia message transmission and reception, among others.

The wireless internet module 113 supports Internet access for the mobile terminal 100. This module may be internally or externally coupled to the mobile terminal 100. In this case, the wireless Internet technology can include WLAN (Wireless LAN), (Wi-Fi), Wibro (Wireless broadband), Wimax (World Interoperability for Microwave Access), HSDPA (High Speed Downlink Packet Access), GSM, CDMA, WCDMA, LTE (Long Term Evolution) etc.

Wireless internet access by Wibro, HSPDA, GSM, CDMA, WCDMA, LTE or the like is achieved via a mobile communication network. In this aspect, the wireless internet module 113 configured to perform the wireless internet access via the mobile communication network can be understood as a sort of the mobile communication module 112.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

The position-location module 115 identifies or otherwise obtains the location of the mobile terminal 100. If desired, this module may be implemented with a global positioning system (GPS) module. According to the current technology, the GPS module 115 is able to precisely calculate current 3-dimensional position information based on at least one of longitude, latitude and altitude and direction (or orientation) by calculating distance information and precise time information from at least three satellites and then applying triangulation to the calculated information. Currently, location and time information are calculated using three satellites, and errors of the calculated location position and time information are then amended using another satellite. Besides, the GPS module 115 is able to calculate speed information by continuously calculating a real-time current location.

Referring to FIG. 1, the audio/video (A/V) input unit 120 is configured to provide audio or video signal input to the mobile terminal 100. As shown, the A/V input unit 120 includes a camera 121 and a microphone 122. The camera 121 receives and processes image frames of still pictures or video, which are obtained by an image sensor in a video call mode or a photographing mode. In addition, the processed image frames can be displayed on the display 151.

The image frames processed by the camera 121 can be stored in the memory 160 or can be externally transmitted via the wireless communication unit 110. Optionally, at least two cameras 121 can be provided to the mobile terminal 100 according to environment of usage.

The microphone 122 receives an external audio signal while the portable device is in a particular mode, such as phone call mode, recording mode and voice recognition. This audio signal is processed and converted into electric audio data. The processed audio data is transformed into a format transmittable to a mobile communication base station via the mobile communication module 112 in case of a call mode. The microphone 122 typically includes assorted noise removing algorithms to remove noise generated in the course of receiving the external audio signal.

The user input unit 130 generates input data responsive to user manipulation of an associated input device or devices. Examples of such devices include a button 136 provided to front/rear/lateral side of the mobile terminal 100 and a touch sensor (constant pressure/electrostatic) 137 and may further include a key pad, a dome switch, a jog wheel, a jog switch and the like.

The sensing unit 140 provides sensing signals for controlling operations of the mobile terminal 100 using status measurements of various aspects of the mobile terminal. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100. By non-limiting example, such sensing unit 140 include, gyro sensor, accelerate sensor, geomagnetic sensor.

As an example, consider the mobile terminal 100 being configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device. In addition, the sensing unit 140 can include a proximity sensor 141.

The output unit 150 generates outputs relevant to the senses of sight, hearing, touch and the like. And, the output unit 150 includes the display 151, an audio output module 152, an alarm unit 153, and a haptic module 154 and the like.

The display 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display 151 may additionally or alternatively display images which are associated with these modes, the UI or the GUI.

The display module 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the above displays can be implemented in a transparent or optical transmittable type, which can be named a transparent display. As a representative example for the transparent display, there is TOLED (transparent OLED) or the like. A rear configuration of the display 151 can be implemented in the optical transmittive type as well. In this configuration, a user is able to see an object in rear of a terminal body via the area occupied by the display 151 of the terminal body.

At least two displays 151 can be provided to the mobile terminal 100 in accordance with the implemented configuration of the mobile terminal 100. For instance, a plurality of displays can be arranged on a single face of the mobile terminal 100 in a manner of being spaced apart from each other or being built in one body. Alternatively, a plurality of displays can be arranged on different faces of the mobile terminal 100.

In case that the display 151 and the touch sensor 137 configures a mutual layer structure (hereinafter called 'touch screen'), it is able to use the display 151 as an input device as well as an output device. In this case, the touch sensor can be configured as a touch film, a touch sheet, a touchpad or the like.

The touch sensor 137 can be configured to convert a pressure applied to a specific portion of the display 151 or a variation of a capacitance generated from a specific portion of the display 151 to an electric input signal. Moreover, it is able to configure the touch sensor 137 to detect a pressure of a touch as well as a touched position or size.

If a touch input is made to the touch sensor 137, signal(s) corresponding to the touch is transferred to a touch controller. The touch controller processes the signal(s) and then transfers the processed signal(s) to the controller 180. Therefore, the controller 180 is able to know whether a prescribed portion of the display 151 is touched.

Figure 2:
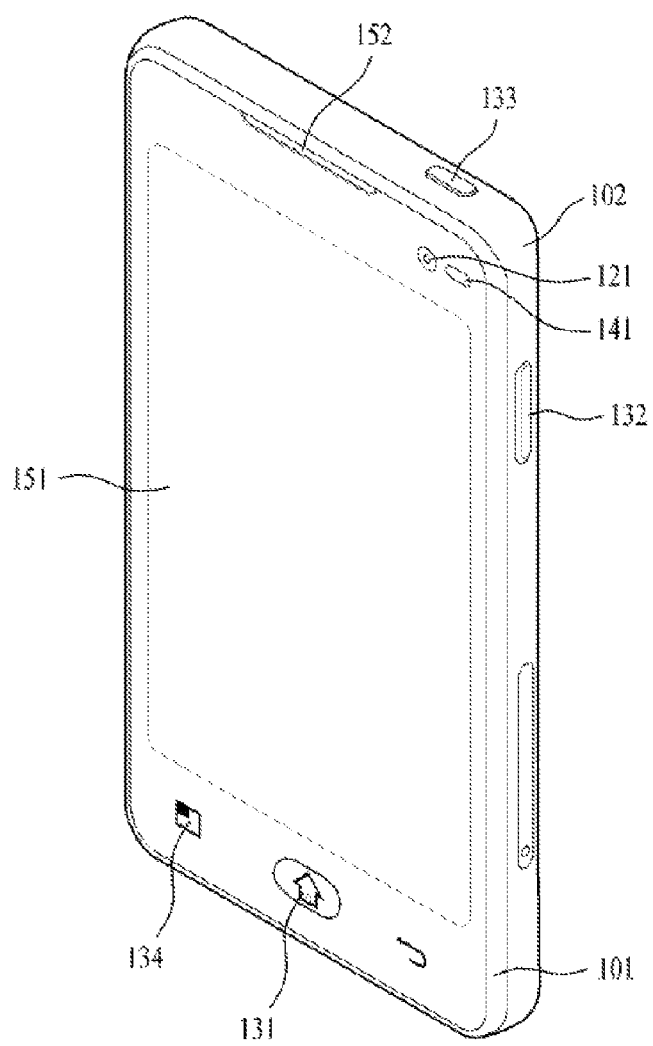
FIG. 2 is a front perspective view of the mobile terminal according to one embodiment of the present invention.

Referring to FIGS. 1 and 2, a proximity sensor 141 can be provided to an internal area of the mobile terminal 100 enclosed by the touchscreen or around the touchscreen. The proximity sensor 141 is the sensor that detects a presence or non-presence of an object approaching a prescribed detecting surface or an object existing around the proximity sensor using an electromagnetic field strength or infrared ray without mechanical contact. Hence, the proximity sensor has durability longer than that of a contact type sensor and also has utility wider than that of the contact type sensor.

The proximity sensor 141 can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and the like. In case that the touchscreen includes the electrostatic capacity proximity sensor, it is configured to detect the proximity of a pointer using a variation of electric field according to the proximity of the pointer. In this case, the touchscreen (touch sensor) can be classified as the proximity sensor.

For clarity and convenience of the following description, as a pointer becomes proximate to a touchscreen without coming into contact with the touchscreen, if the pointer is perceived as situated over the touchscreen, such an action shall be named 'proximity touch'. If a pointer actually comes into contact with a touchscreen, such an action shall be named 'contact touch'. A proximity-touched position over the touchscreen with the pointer may mean a position at which the pointer vertically opposes the touchscreen when the touchscreen is proximity-touched with the pointer.

The proximity sensor 141 detects a proximity touch and a proximity touch pattern (e.g., a proximity touch distance, a proximity touch duration, a proximity touch position, a proximity touch shift state, etc.). In addition, information corresponding to the detected proximity touch action and the detected proximity touch pattern can be outputted to the touchscreen.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm unit 153 is output a signal for announcing the occurrence of a particular event associated with the mobile terminal 100. Typical events include a call received event, a message received event and a touch input received event. The alarm unit 153 is able to output a signal for announcing the event occurrence by way of vibration as well as video or audio signal. The video or audio signal can be output via the display 151 or the audio output module 152. Hence, the display 151 or the audio output module 152 can be regarded as a part of the alarm unit 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be output in a manner of being synthesized together or can be output in sequence.

The haptic module 154 is able to generate various tactile effects as well as the vibration. For instance, the haptic module 154 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hold/cold sense using an endothermic or exothermic device and the like.

The haptic module 154 can be implemented to enable a user to sense the tactile effect through a muscle sense of finger, arm or the like as well as to transfer the tactile effect through a direct contact. Optionally, at least two haptic modules 154 can be provided to the mobile terminal 100 in accordance with the corresponding configuration type of the mobile terminal 100.

The memory unit 160 is generally used to store various types of data to support the processing, control, and storage requirements of the mobile terminal 100. Examples of such data include program instructions for applications operating on the mobile terminal 100, contact data, phonebook data, messages, audio, still pictures (or photo), moving pictures, etc. In addition, a recent use history or a cumulative use frequency of each data (e.g., use frequency for each phonebook, each message or each multimedia) can be stored in the memory unit 160. Moreover, data for various patterns of vibration and/or sound output in case of a touch input to the touchscreen can be stored in the memory unit 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. In addition, the mobile terminal 100 is able to operate in association with a web storage for performing a storage function of the memory 160 on Internet.

The interface unit 170 is often implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices.

The interface unit 170 may be configured using a wired/wireless headset port, an external charger port, a wired/wireless data port, a memory card port, a port for coupling to a device having an identity module, audio input/output ports, video input/output ports, an earphone port and/or the like.

The identity module is the chip for storing various kinds of information for authenticating a use authority of the mobile terminal 100 and can include User Identify Module (UIM), Subscriber Identity Module (SIM), Universal Subscriber Identity Module (USIM) and/or the like. A device having the identity module (hereinafter called 'identity device') can be manufactured as a smart card. Therefore, the identity device is connectible to the mobile terminal 100 via the corresponding port.

When the mobile terminal 110 is connected to an external cradle, the interface unit 170 becomes a passage for supplying the mobile terminal 100 with a power from the cradle or a passage for delivering various command signals input from the cradle by a user to the mobile terminal 100. Each of the various command signals input from the cradle or the power can operate as a signal enabling the mobile terminal 100 to recognize that it is correctly loaded in the cradle.

The controller 180 typically controls the overall operations of the mobile terminal 100. For example, the controller 180 performs the control and processing associated with voice calls, data communications, video calls, etc. The controller 180 may include a multimedia module 181 that provides multimedia playback. The multimedia module 181 may be configured as part of the controller 180, or implemented as a separate component.

Moreover, the controller 180 is able to perform a pattern (or image) recognizing process for recognizing a writing input and a picture drawing input carried out on the touchscreen as characters or images, respectively.

The power supply unit 190 provides power required by the various components for the mobile terminal 100. The power may be internal power, external power, or combinations thereof.

A battery may include a built-in rechargeable battery and may be detachably attached to the terminal body for a charging and the like. A connecting port may be configured as one example of the interface 170 via which an external charger for supplying a power of a battery charging is electrically connected.

Various embodiments described herein may be implemented in a computer-readable medium using, for example, computer software, hardware, or some combination thereof.

For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

Next, FIG. 2 is a front perspective diagram of a mobile terminal according to one embodiment of the present invention.

The mobile terminal 100 shown in the drawing has a bar type terminal body. Yet, the mobile terminal 100 may be implemented in a variety of different configurations. Examples of such configurations include folder-type, slide-type, rotational-type, swing-type and combinations thereof. For clarity, further disclosure will primarily relate to a bar-type mobile terminal 100. However such teachings apply equally to other types of mobile terminals.

Referring to FIG. 2, the mobile terminal 100 includes cases 101 and 102 configuring an exterior thereof. In the present embodiment, the case can be divided into a front case 101 and a rear case 102. Various electric/electronic parts are loaded in a space provided between the front and rear cases 101 and 102.

Occasionally, electronic components can be mounted on a surface of the rear case 102. The electronic part mounted on the surface of the rear case 102 may include such a detachable part such as a battery, a USIM card, a memory card and the like. In doing so, the rear case 102 may further include a backside cover 103 (see FIG.3) configured to cover the surface of the rear case 102. In particular, the backside cover 103 has a detachable configuration for the user's convenience. If the backside cover 103 is detached from the rear case 102, the surface of the rear case 102 is exposed.

Figure 3:
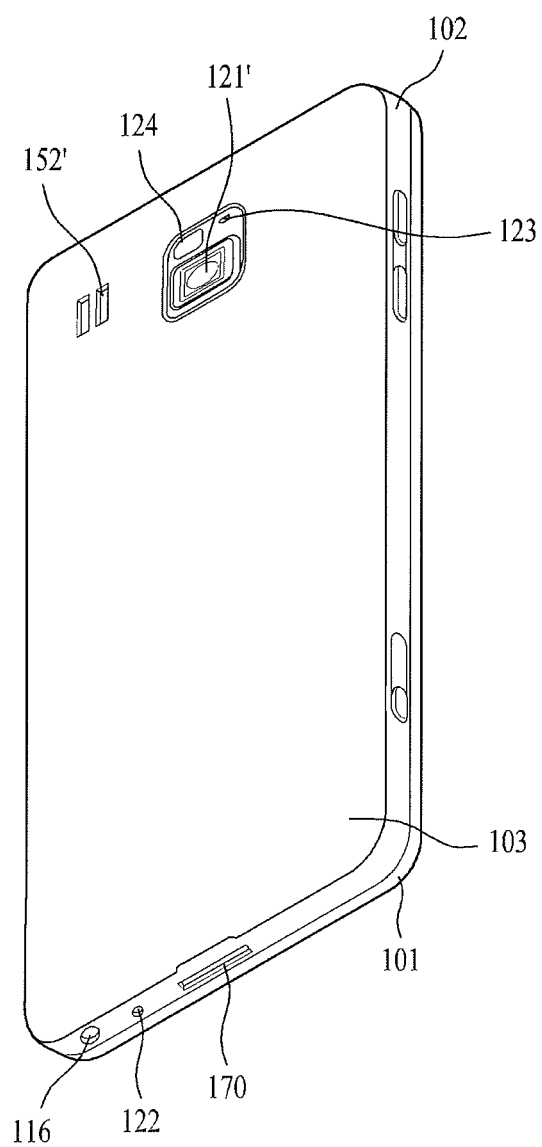
FIG. 3 is a rear perspective view of the mobile terminal according to one embodiment of the present invention.

Referring to FIG. 3, if the backside cover 103 is attached to the rear case 102, a lateral side of the rear case 102 may be exposed in part. If a size of the backside cover 103 is decreased, a rear side of the rear case 102 may be exposed in part. If the backside cover 103 covers the whole rear side of the rear case 102, it may include an opening configured to expose a camera 121' or an audio output module 152' externally.

The front case 101, rear case 102 and backside cover 103 can be formed by injection molding of synthetic resin or can be formed of metal substance such as stainless steel (STS), titanium (Ti) or the like for example.

A display 151, an audio output module 152, a camera 121, user input units 130/131 and 132, a microphone 122, an interface 170 and the like can be provided to the case 101 or 102.

The display 151 occupies most of a main face of the front case 101. The audio output module 152 and the camera 121 are provided to an area adjacent to one of both end portions of the display 151, while the user input unit 131 and the microphone 122 are provided to another area adjacent to the other end portion of the display 151. The user input unit 132 and the interface 170 can be provided to lateral sides of the front and rear cases 101 and 102.

The input unit 130 is manipulated to receive a command for controlling an operation of the terminal 100. And, the input unit 130 is able to include a plurality of manipulating units 131 and 132. The manipulating units 131 and 132 can be named a manipulating portion and may adopt any mechanism of a tactile manner that enables a user to perform a manipulation action by experiencing a tactile feeling.

Content input by the first or second manipulating unit 131 or 132 can be diversely set. For instance, such a command as start, end, scroll and the like is input to the first manipulating unit 131. In addition, a command for a volume adjustment of sound output from the audio output module 152 and the like can be input to the second manipulating unit 132, a command for a switching to a touch recognizing mode of the display 151 and the like can be input to the second manipulating unit 133.

A button type is configured to recognize a pressure applied by a user to each of the manipulation units 131, 132 and 133. If a touch sensor is provided to each of the manipulation units 131, 132 and 133 in addition to the display unit 151, a user's command can be inputted by a user's touch.

FIG. 3 is a perspective diagram of a backside of the terminal shown in FIG. 2.

Referring to FIG. 3, the camera 121' can be additionally provided to a backside of the terminal body, and more particularly, to the rear case 102. The camera 121 has a photographing direction that is substantially opposite to that of the former camera 121 shown in FIG. 2 and may have pixels differing from those of the firmer camera 121.

Preferably, for instance, the camera 121 has low pixels enough to capture and transmit a picture of user's face for a video call, while the latter camera 121' has high pixels for capturing a general subject for photography without transmitting the captured subject. In addition, each of the cameras 121 and 121' can be installed at the terminal body to be rotated or popped up.

A flash 123 and a mirror 124 are additionally provided adjacent to the camera 121'. The flash 123 projects light toward a subject in case of photographing the subject using the camera 121'. In case that a user attempts to take a picture of the user (self-photography) using the camera 121', the mirror 124 enables the user to view user's face reflected by the mirror 124.

The additional audio output module 152' can be provided to the backside of the terminal body. The additional audio output module 152' is able to implement a stereo function together with the former audio output module 152 shown in FIG. 2A and may be used for implementation of a speakerphone mode in talking over the terminal.

A broadcast signal receiving antenna 116 can be additionally provided to the lateral side of the terminal body as well as an antenna for communication or the like. The antenna 116 constructing a portion of the broadcast receiving module 111 shown in FIG. 1 can be retractably provided to the terminal body.

Figure 4:
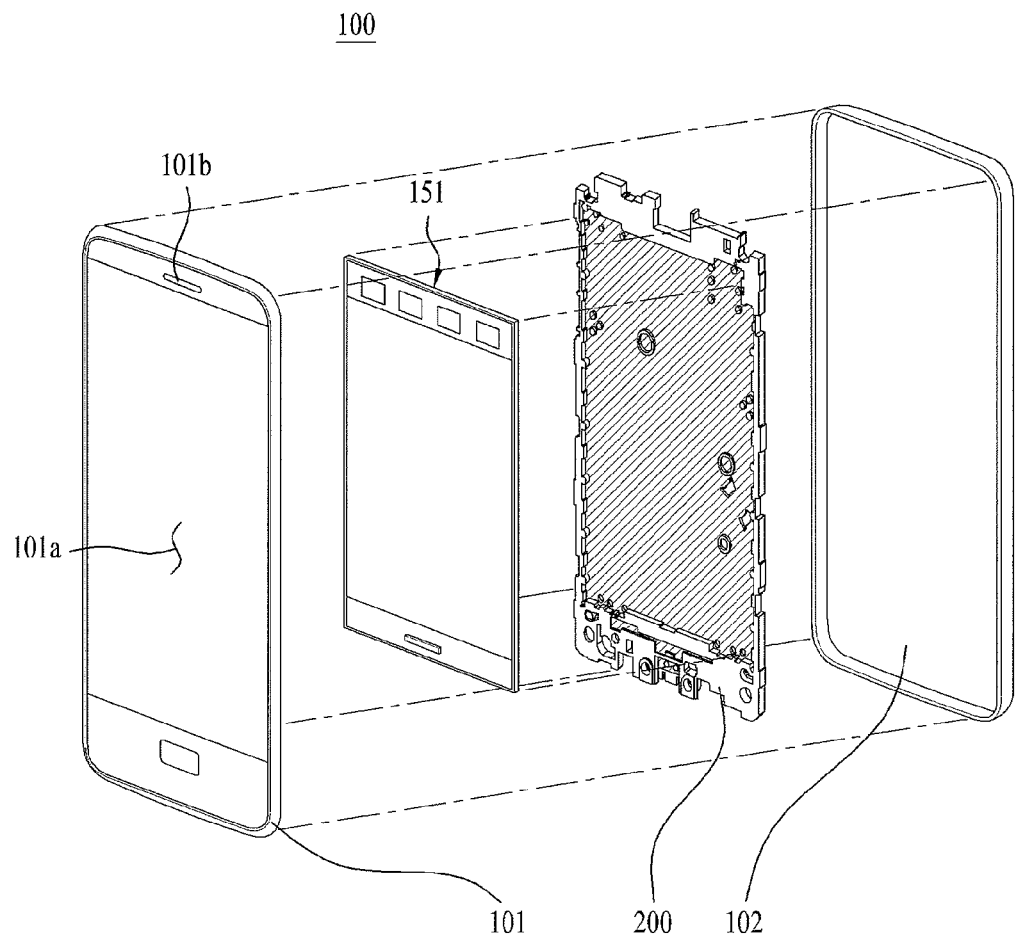
FIG. 4 is an exploded perspective view of the mobile terminal according to one embodiment of the present invention.

FIG. 4 is an exploded perspective view of the mobile terminal according to one embodiment of the present invention, showing a front case 101, a display 151, a bracket 200 and a rear case 102.

The case is configured of the front case 101 and the rear case 102 coupled to each other, to provide a predetermined space where electronic components are mounted. A through hole 101a for exposing the display 151 there through and an audio hole 101b a passage of sound outputted from the audio output module 152 may be formed in a front surface of the front case 101.

The display 151 may be arranged via the through hole 101a of the front case 101 and a liquid crystal panel may be used as the display 151, for a notable example. A backlight unit is connected to a back side of such a liquid crystal panel to provide light. To make a layer structure solid, a SUS frame may be used in covering side and back surfaces.

When using the SUS frame, a side surface except the screen could be widened to widen bezel formed in an edge portion of the display 151 disadvantageously. Accordingly, such the SUS frame of the display may be omitted. Instead, the bracket 200 capable of fixing the display 151 to the case and mounting the electronic components therein may be provided to reinforce the rigidity of the display 151. The static electricity applied to the mobile terminal if the SUS frame is omitted could flow to the display 151 as it is only to cause an error of the display 151.

The bracket 200 according to the present invention may support the display 151 and it may include a metallic plate 205 that is grounded to flow the static electricity applied to the display 151 toward the bracket 200.

Figure 5:
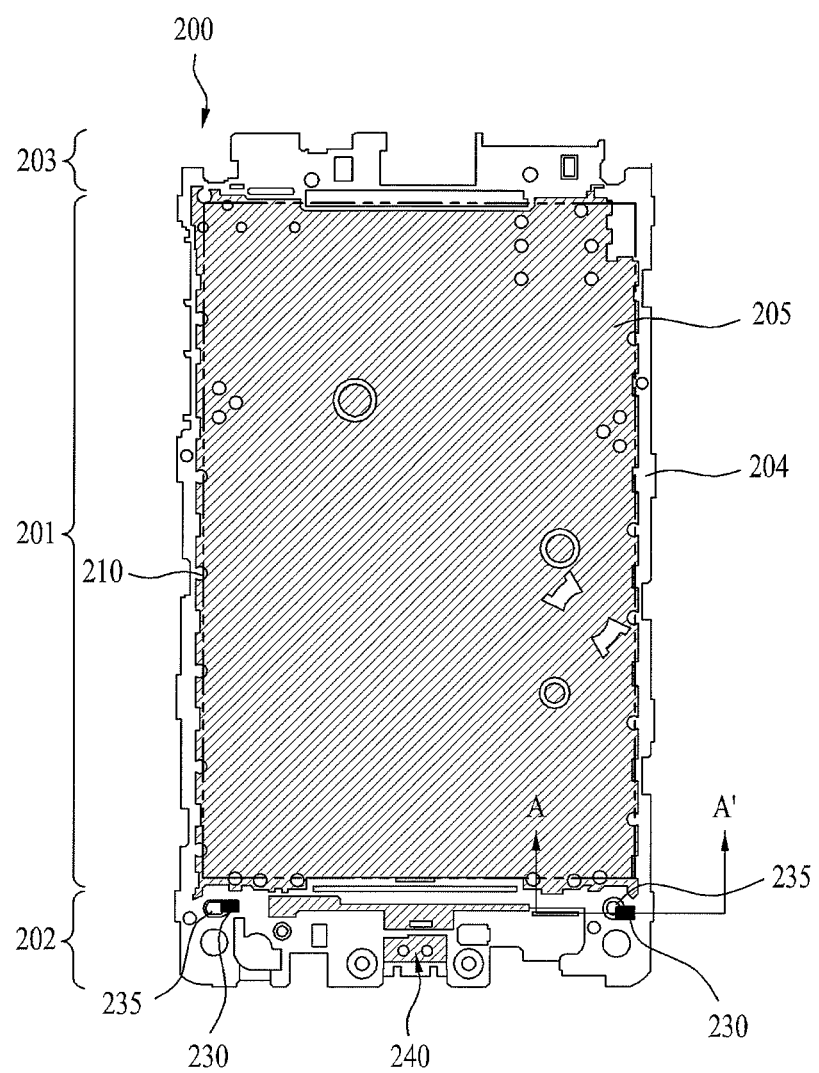
FIG. 5 is a plane diagram illustrating a bracket of the mobile terminal according to one embodiment of the present invention.

As shown in FIG. 5, the bracket 200 consists of a metallic plate 205 and an injection mold 204. It is difficult to form a micro sized unevenness (such as a male-and-female portion) where various parts can be mounted in the metallic plate 205. Using a double injection method, the bracket 200 having the injection mold 204 partially formed therein may be formed.

The metallic plate 205 may reinforce the rigidity of the bracket 200 and it is formed of metal that is a conductivity material. The static electricity may escape through the metallic plate 205. As shown in FIG. 5, the metallic plate 205 is partially exposed outside and the exposed portion may be a seating portion where the display 151 is seated. Also, the metallic plate 205 is partially covered by the injection mold 204.

The portion where the metallic plate 205 is exposed and the electronic components of the mobile terminal are electrically connected with each other by the electric current carrying structure which will be described later. Accordingly, the damage generated by the static electricity applied to the electronic components may be avoided.

The bracket 200 according to the present invention may not simply support only the display 151 in the case but be upward and downward extended from the portion where the display 151 is seated to support the electronic components including the audio output module 152 located beyond and the user input unit and the interface unit located below. The portion where the display 151 is seated may be referenced to as 'a first bracket 201' and the downward extended portion may be referenced to as 'a second bracket 202'. The upward extended portion may be referenced to as 'a third bracket 203'.

The first bracket 201 includes a seated portion 210 coupled to a back surface of the display 151 and the metallic plate 205 configured to support the rigidity of the display 151. The metallic plate 205 may be exposed to a bottom of the seating portion 210, to directly contact with the back surface of the display 151 as shown in FIG. 5.

The second bracket 202 is extended from the first bracket 201 downward. The user input unit 131 and the interface unit 170 which are located under the display 151 may be coupled to the second bracket 202. Electronic components mounted in the second bracket 202 are not as flat as the display 151 and a male-and-female portion is provided to be fitted to the electronic components mounted in a surface of the bracket 200. The male-and-female portion is realized by the injection mold 204, only to be partially exposed to a portion requiring the electric current carrying structure.

The third bracket 203 is extended from the first bracket 201 upward. The audio output module 152 and the camera 121 and the like which are positioned beyond the display 151 may be seated in the third bracket 203.

The metallic plate 205 may be exposed to the surface of the bracket 200 via the seating portion of a circuit board provided in the user input unit 131, an interface unit coupled portion 240 and a guide hole 235 having a conductive gasket 230 coupled thereto. Such a conductive gasket 230 will be described later.

Figure 6:
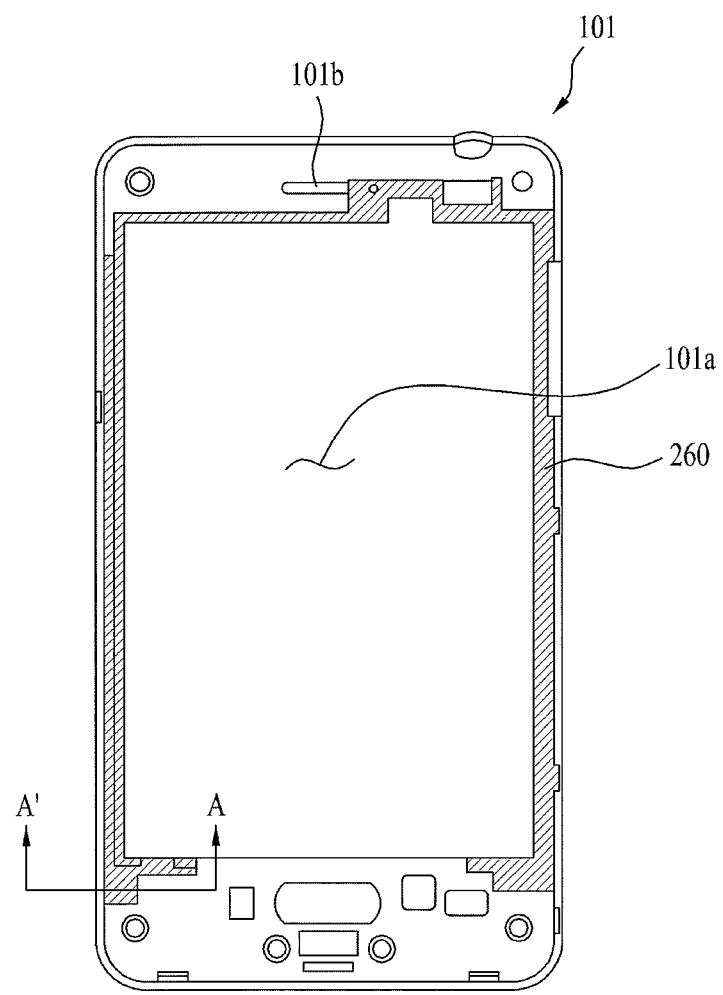
FIG. 6 is a rear view illustrating a front case of the mobile terminal according to one embodiment of the present invention.
Figure 7:
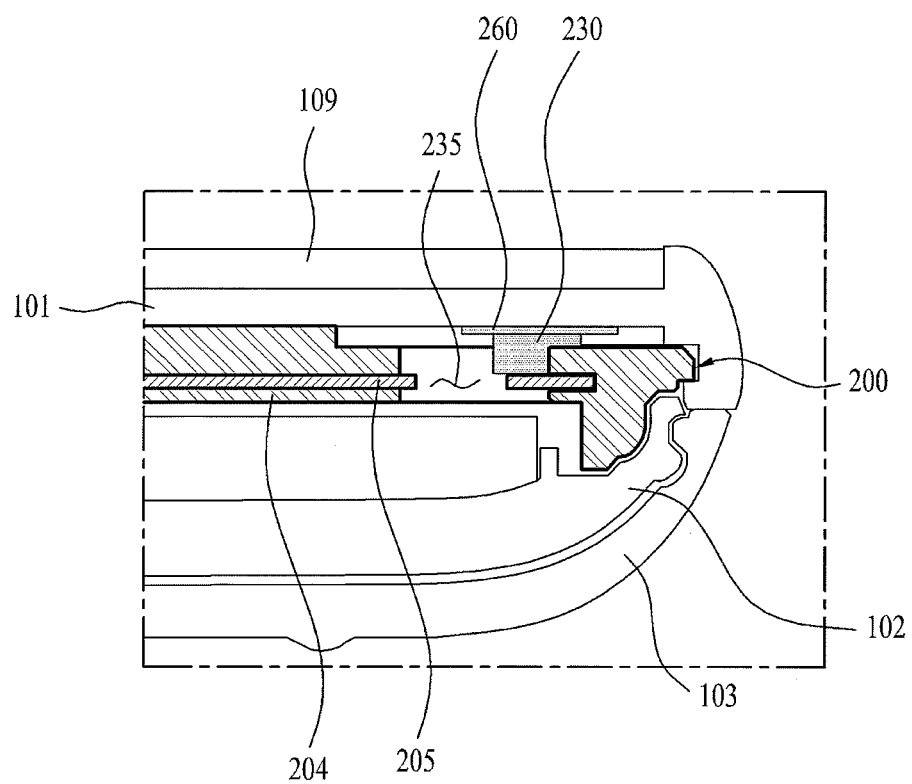
FIG. 7 is a sectional view illustrating a bracket and a display of the mobile terminal according to one embodiment of the present invention.

First of all, referring to FIGS. 6 and 7, the bracket 200 and the display 150 will be described as follows. FIG. 6 is a rear view illustrating the front case of the mobile terminal according to one embodiment of the present invention. FIG. 7 is a sectional view illustrating the bracket and the display of the mobile terminal according to one embodiment of the present invention.

Referring to FIG. 6, the mobile terminal 100 includes an electric current carrying pattern 260 provided in an inner circumference of the through hole 101a formed in the case, in other words, a portion of the case 101 that contacts with the display 151. Such an electric current carrying pattern 260 is formed of a conductive material. The electric current carrying pattern 260 may be partially formed in an inner surface of the front case 101 according to a sputtering method. Specifically, a conductive material such as metal is partially sputtered on the inner surface of the front case 101. The electric current carrying pattern 260 is in contact with the display 151 and it restrict the static electricity from flowing to the display 151 in the electric current carrying pattern 260, not transferred to the display 151.

The static electricity restricted in the electric current carrying pattern 260 may be exhausted via the metallic plate 205 of the bracket 200. As shown in FIG. 5, the injection mold 204 is partially provided to electrically connect the electric current carrying pattern 260 and the metallic plate 205 of the bracket 200 with each other. A conductive gasket 230 is attached to the exposed portion of the metallic plate 205 to the surface of the bracket 200.

The conductive gasket 230 is spaced apart a predetermined distance from the display 151, to prevent the static electricity from affecting the display 151. Accordingly, the conductive gasket 230 may be formed in the second bracket 202 downwardly extended from the first bracket 201 where the display 151 is coupled, as shown in the drawings.

When the conductive gasket 230 is formed in the second bracket 202, the electric current carrying pattern 260 may be extended from a circumference of the display 151 downward to contact with the conductive gasket 203 as shown in FIG. 6.

The conductive gasket 230 is a material configured to compensate the distance between the metallic plate 205 of the bracket and the electric current carrying pattern 260 formed in the case. The metallic plate 205 of the bracket 200 is in contact with the back side of the display 151 and it is spaced a predetermined distance farther than the thickness of both the electric current carrying pattern 260 formed in the inner circumference of the through window of the front case 101 and the display.

When the bracket 200 is coupled to the front case 101, an air gap could be formed and a transformable material having elasticity may be used in compensating the air gap.

The conductive gasket 230 may be projected forward, compared with a front surface of the bracket 200, before coupled to the front case 101. When the bracket 200 is coupled to the front case 101, the conductive gasket 230 is pressed and the electric current carrying pattern and the metallic plate 205 are electrically connected with each other.

As shown in FIG. 5, the conductive gasket 230 may be coupled to the exposed portion of the metallic plate 205 via the guide hole 235. The guide hole 235 is required to fix the metallic plate 205 to an appropriate position of a die-mold in a double injection molding process. A mold is inserted in the guide hole 235 and an inside of the guide hole 235 is not covered but exposed by the injection mold 204. The conductive gasket 230 may be attached to the exposed portion.

Referring to FIG. 7, it is shown that the electric current carrying pattern 260 of the front case 101 is connected with the metallic plate 205 of the bracket 200 via the conductive gasket 230. According to sectional views in A-A' of FIG. 5 and A-A' of FIG. 6, the static electricity restricted in the electric current carrying pattern 260 as shown in FIG. 6, failing to flow to the display 151, may be exhausted via the conductive gasket 230 and the metallic plate 205 from the electric current carrying pattern 260 as shown in FIG. 7.

Figure 8:
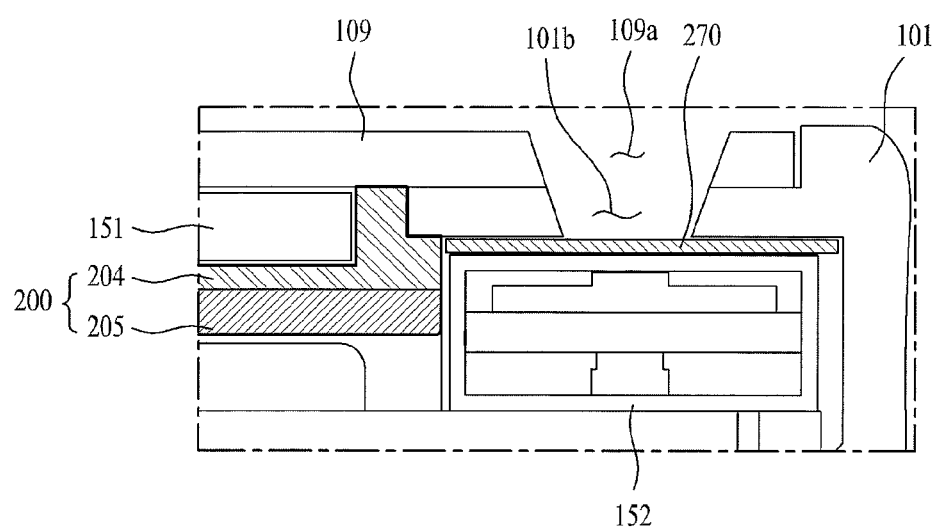
FIG. 8 is a sectional view illustrating a bracket and a receiver of the mobile terminal according to one embodiment of the present invention.

Hence, FIG. 8 is a sectional view illustrating the bracket and a receiver of the mobile terminal according to one embodiment of the present invention. Referring to FIG. 8 will be described the structure of moving the static electricity applied to the audio output module 152 according to the present invention toward the metallic plate 205.

Referring to FIG. 8, the audio output module 152 is positioned in a back surface of an audio hole 109a formed in a window glass 109 coupled to a front surface of the front case 101 and a back surface of an audio hole 101b formed in the front case 101. Such an audio hole 109a or 101b can be formed only in the front case 101 or in the window glass 109.

If the static electricity is applied to the audio output module 152 via the audio holes 109a and 101b, the audio output module 152 might be damaged. As shown in FIG. 8, a metal mesh 270 is disposed between the audio hole 101b and the audio output module 152.

The metal mesh 270 is a mesh structure formed of a metallic material. Sound can pass through the metal mesh 270 and hold the static electricity inputted to the audio output module 152. That is a similar principle as the electric current carrying pattern 260.

Different from the display 151, the audio output module 152 is totally exposed via the audio hole 101b. Because of that, only the electric current carrying pattern 260 cannot shut off the static electricity applied to the audio output module 152. The metal mesh 270 is provided to cover the audio hole 101b.

An end of the metal mesh 270 is arranged adjacent to or in contact with the metallic plate 205 of the bracket 200. Although not in physical contact, the former can move a short distance spaced from the former. The static electricity drawn via the audio hole 101b can move to the metallic plate 205 via the metal mesh 270, not moving to the audio output module 152.

Optionally, the metal mesh 270 is arranged in contact with the electric current carrying pattern 260 formed in the front case 101, to be electrically connected with the metallic plate 205 of the bracket 200 via the electric current carrying pattern 260.

Figure 9:
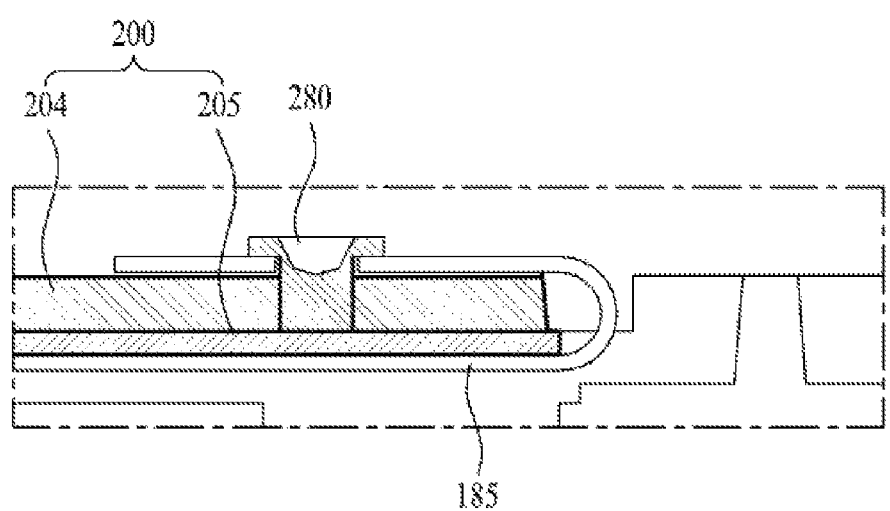
FIG. 9 is a sectional view illustrating a bracket and a circuit substrate of the mobile terminal according to one embodiment of the present invention.

Hence, FIG. 9 is a sectional view illustrating the bracket and the circuit substrate of the mobile terminal according to one embodiment of the present invention. Referring to FIG. 9, a connection part allowing the static electricity applied to the circuit board 185 of the mobile terminal to flow to the metallic plate 205 will be described.

The circuit board 185 is a plate-shaped member having a circuit pattern formed thereon to transmit an electric signal to the parts. Although a solid material can be used for the circuit board 185, a flexible material may be used for utility of a small space as shown in FIG. 9.

The electric signal is transmitted via the circuit pattern formed on the circuit board 185. After that, if the static electricity is applied, such a signal system could be crossed. Damage to the circuit pattern might be a cause of the error. Moreover, the static electricity might be transmitted even to the other components via the circuit board and a structure capable of preventing that is necessary.

As shown in FIG. 9, the circuit board 185 may contact with the surface of the bracket 200. When it is exposed to the surface of the bracket 200, the metallic plate 205 may directly contact with the circuit board 185. However, the metallic plate 205 is covered by the injection mold 204 and the circuit board 185 may not directly contact with the metallic plate 205 accordingly.

In this instance, a screw 280 formed of a metallic material is coupled to the bracket 200 via the circuit board 185, to contact with the metallic plate 205. In other words, the circuit board 185 is fastened to the bracket 200 by the screw 280 and simultaneously connected with the bracket to allow the static electricity applied to the circuit board 185 exhausted via the metallic plate 205.

Figure 10:
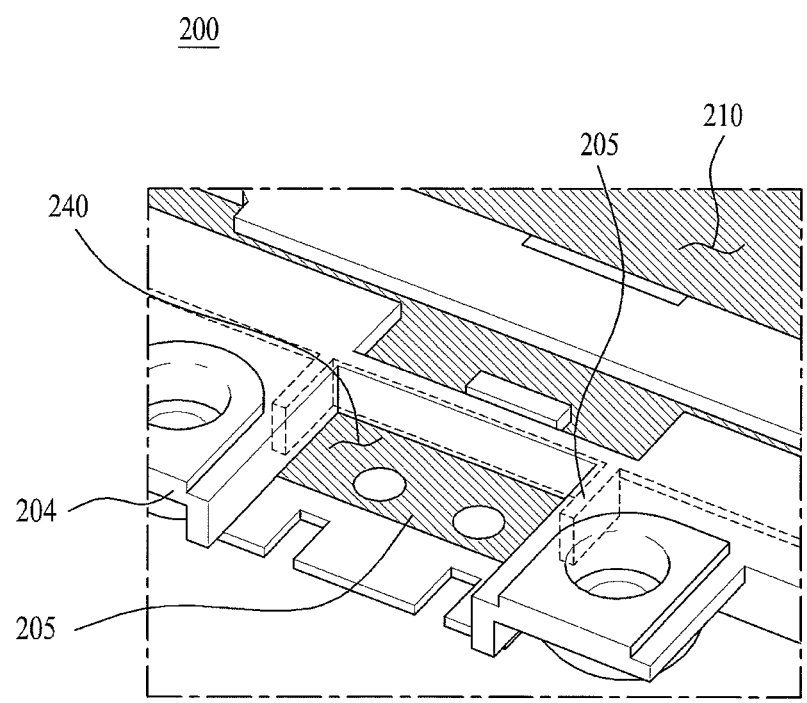
FIG. 10 is a perspective view illustrating a recess of the bracket provided in the mobile terminal according to one embodiment of the present invention.
Figure 11:
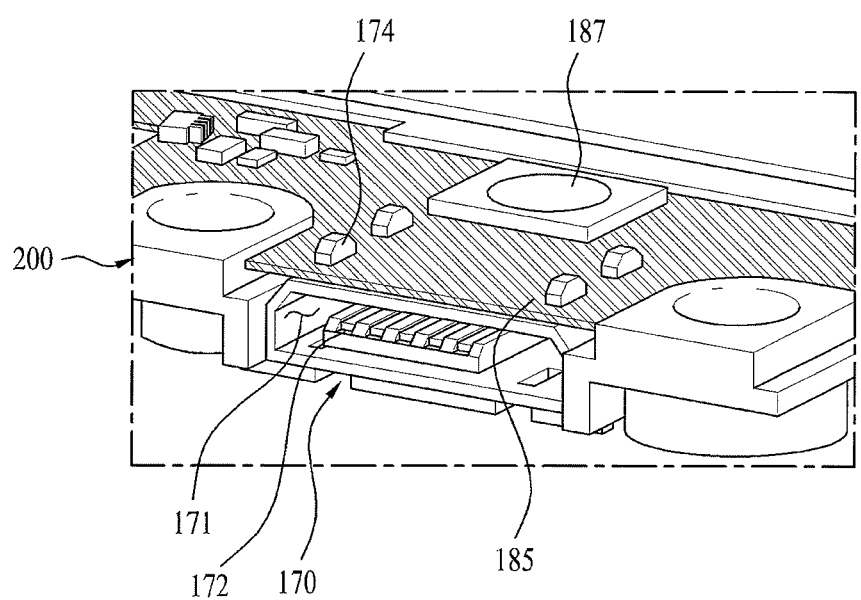
FIG. 11 is a perspective view illustrating a state where an interface unit is coupled to a bracket of the mobile terminal according to one embodiment of the present invention.
Figure 12:
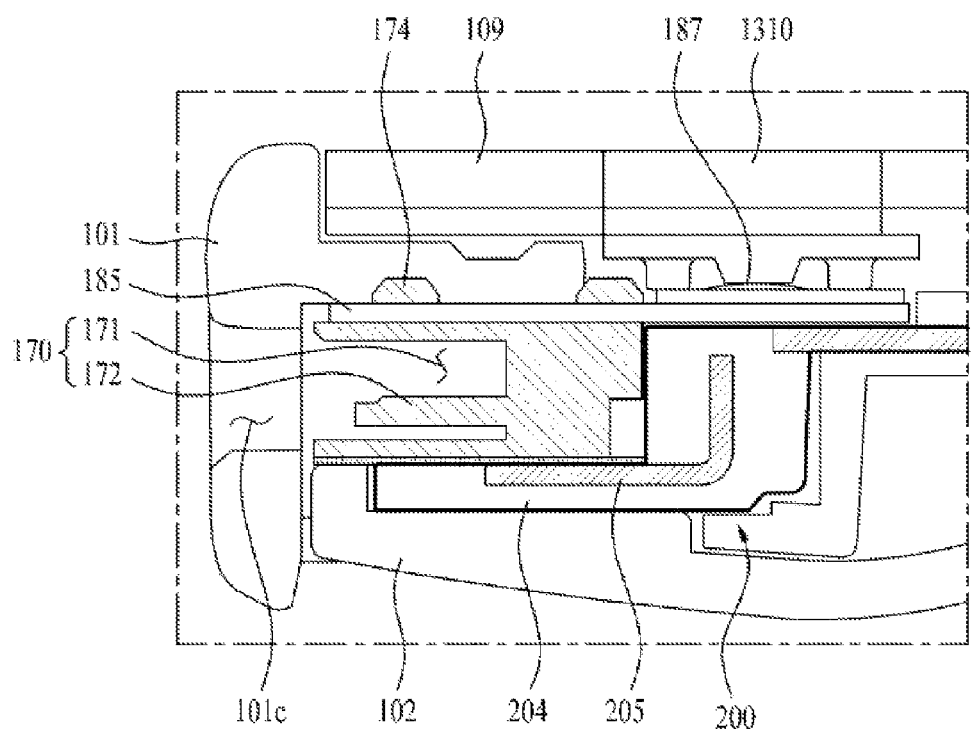
FIG. 12 is a sectional view illustrating the state where an interface is coupled to a bracket of the mobile terminal according to one embodiment of the present invention.

FIG. 10 is a perspective view illustrating a recess 240 of the second bracket 202 provided in the mobile terminal according to one embodiment of the present invention. FIGS. 11 and 12 are perspective and sectional diagrams illustrating a state where the interface unit 170 is coupled to the second bracket 202 of the mobile terminal according to one embodiment of the present invention. Referring to FIGS. 10 to 12, the recess 240 and the interface unit 170 coupled to the recess 240 will be described as follows.

The interface unit 170 includes a socket 171 having an opening corresponding to a shape of an external input/output terminal to insert an external input/output terminal therein and a pin 172 electrically connected with the external input/output terminal in the socket to receive an electric power or signal.

The socket may be arranged in the terminal inserting hole 101c formed in a lower end of the case to be exposed outside. Optionally, the socket may be closable to prevent dust or foreign maters from coming into the inserting hole 101c.

An auxiliary frame is used in order to fix the conventional interface unit 170 to the mobile terminal cases 101 and 102. However, recently, the display 151 is enlarged and the bezel size is reduced such that it can be necessary to reduce the number of the materials.

It will be shown as follows that the bracket 200 supporting the display 151 is extended downward to seat the interface unit 170 thereon. As mentioned above, the display seated portion is referenced to as the first bracket 201 and the extended portion is referenced to as the second bracket 202.

The interface unit 170 may provide a predetermined space where the external input/output terminal is inserted and it may have a predetermined thickness. While the display 151 is tilted to the front surface of the mobile terminal, the interface unit 170 may be positioned in the middle of the front and back surfaces of the mobile terminal.

Accordingly, to provide the seating structure to the interface unit 170, the second bracket 202 includes a recess 240 recessed toward the back surface of the mobile terminal, compared with the first bracket 201. Accordingly, the interface unit 170 seated in the recess 240 may be tilted toward the back surface with respect to the display 151 arranged under the display 151.

As shown in FIGS. 10 to 12, the interface unit 170 may be inserted in the recess 240 recessed toward the back surface of the mobile terminal more than the first bracket 201. The shape of the metallic plate 205 is processed and the metallic plate 205 is arranged in a bottom or side surface of the interface unit 170 to enhance the rigidity of the recess 240.

The interface unit 170 inserted in the recess 240 is supported by the metallic plate 205 and it is not subject to breakage accordingly. At this time, the metallic plate 205 may not be exposed but covered by the injection mold 204 as shown in FIG. 11.

The recess 240 may partially expose the metallic plate 205 to an inner circumferential surface thereof, to make the metallic plate 205 exposed to the surface contacting with the interface unit 170 to exhaust the static electricity applied to the interface unit 170. At this time, a double-sided conductive tape used in attaching the interface unit 170 to the metallic plate 205 exposed to the surface to make it surface-contact with the metallic plate.

As shown in FIGS. 11 and 12, the circuit board 185 may be mounted on the interface unit 170 inserted in the recess 240. The circuit board 185 electrically connects the interface 170 with the electronic components of the mobile terminal including the control unit 180. The electric power transmitted from the interface unit 170 or the data transmitted/received by the interface unit 170 may be transmitted/received via the circuit board 185. In this instance, the circuit board 185 may be formed of a solid or flexible material.

The electric connection with the circuit pattern of the circuit board 185 may be realized by conductive adhesives or soldering. For structural connection, a coupling projection 174 may be provided in the interface unit 170 and the coupling projection 174 may pass through the circuit board 185 to be coupled to the circuit board.

The user input unit 131 and 134 positioned under the display 151 may be coupled to a front surface of the circuit board 185.

When the user input unit is a button type 131 pressed physically, the user input unit may include a button 1310 exposed to the surface of the case and a metal dome 187 having a dome shape that is changeable according to a presence of pressing of the button 1310. Such a metal dome 187 is positioned in a back surface of the bottom 1310. The metal dome 187 is seated on the circuit board 185 and a concave surface of the metal dome 187 is pressed to change the shape of the metal dome. When the shape of the metal dome is changed, an electric signal is generated and the electric signal is transmitted to the controller 180.

In case the user input unit 134 is provided in a touch type, light is provided to display the position of the user input unit. A light source configured to emit the light to the front surface forward and a light guide film may be provided in the front surface of the circuit board 185.

According to at least one of the embodiments described above, the electric current carrying structure is provided to exhaust the static electricity applied to the display of the mobile terminal via the metallic plate of the bracket. Accordingly, damage and errors generated by the static electricity of the display can be prevented.

Furthermore, the static electricity directly flowing to the audio output module can be bypassed by the bracket and the damage generated by the static electricity of the audio output module can be reduced.

Still further, the electric current carrying structure for electrically connecting the circuit board and the metallic plate of the bracket with each other may bypass the static electricity applied to the circuit board. Accordingly, damage and errors generated by the static electricity can be prevented.

Still further, the present invention may provide the stable connection structure not to break and short-cut the connection structure between the interface unit and the circuit board.

Still further, no auxiliary supporting structure for the interface has to be provided and the volume of the mobile terminal can be reduced.

It will be apparent to those skilled in the art that various modifications and variations can be made in the present invention without departing from the spirit or scope of the inventions.

Thus, it is intended that the present invention covers the modifications and variations of this invention provided they come within the scope of the appended claims and their equivalents.

What is claimed is:

1. A mobile terminal comprising:
   a case having an inner space where electronic components are mounted;
   a display arranged in the inner space of the case, the display being exposed at a front surface of the case;
   a circuit board arranged in the inner space of the case, the circuit board having a circuit pattern to transmit an electric signal;
   an interface unit having a socket having an opening to insert the external input/output terminal therein and a pin electrically connected with the external input/output terminal to receive an electric power or signal;
   a terminal inserting hole formed in a lower end of the case;
   a bracket coupled to a back surface of the display, the bracket including a metallic plate and an injection mold partially covering a surface of the metallic plate,
   wherein the bracket includes:
      a first bracket coupled to the back surface of the display; and
      a second bracket extending from the first bracket and including a recess extended downward to extend away from the back surface of the display, the recess being configured to seat the interface unit therein,
   wherein the interface unit is arranged in the terminal inserting hole to expose the pin via the terminal inserting hole, and
   wherein at least one surface of the recess exposes a portion of the metallic plate to exhaust the static electricity applied to the interface unit and the other surfaces of the recess are covered by the injection mold.

2. The mobile terminal according to claim 1, wherein a double-sided tape is attached to the at least one portion of the metallic plate.

3. The mobile terminal according to claim 1, wherein the circuit board is coupled to a front surface of the second bracket to cover the recess, and
   wherein a back surface of the circuit board is electrically connected with the interface unit to transmit and receive an electric signal.

4. The mobile terminal according to claim 3, wherein the circuit board is a flexible circuit board.

5. The mobile terminal according to claim 3, wherein the interface unit further includes a coupling projection coupled to the circuit board by passing through the circuit board.

6. The mobile terminal of claim 1, further comprising a metal mesh configured to electrically connect the metallic plate to the audio output module.

* * * * *